US012621806B2

(12) United States Patent
Zhao et al.

(10) Patent No.: US 12,621,806 B2
(45) Date of Patent: May 5, 2026

(54) WIRELESS COMMUNICATION METHOD, AND DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 321 days.

(21) Appl. No.: 18/381,733

(22) Filed: Oct. 19, 2023

(65) Prior Publication Data

US 2024/0073868 A1     Feb. 29, 2024

Related U.S. Application Data

(63) Continuation of application No. PCT/CN2021/089013, filed on Apr. 22, 2021.

(51) Int. Cl.
*H04W 72/02*     (2009.01)
*H04W 72/40*     (2023.01)
*H04W 92/18*     (2009.01)

(52) U.S. Cl.
CPC ........... *H04W 72/02* (2013.01); *H04W 72/40* (2023.01); *H04W 92/18* (2013.01)

(58) Field of Classification Search
CPC ...... H04W 72/02; H04W 72/40; H04W 92/18
See application file for complete search history.

(56) References Cited

U.S. PATENT DOCUMENTS

| | | | |
|---|---|---|---|
| 2020/0205166 A1 | 6/2020 | Huang et al. | |
| 2020/0403737 A1 | 12/2020 | Yeo et al. | |
| 2022/0150908 A1 | 5/2022 | Ji et al. | |
| 2024/0032076 A1* | 1/2024 | Li | H04W 72/0453 |

FOREIGN PATENT DOCUMENTS

| | | |
|---|---|---|
| CN | 109217989 A | 1/2019 |
| CN | 110944403 A | 3/2020 |
| CN | 111865485 A | 10/2020 |
| CN | 112350806 A | 2/2021 |
| EP | 3672133 A1 | 6/2020 |
| EP | 4087309 A1 | 11/2022 |

(Continued)

OTHER PUBLICATIONS

Extended European search report issued in corresponding European application No. 21937344.6, mailed May 22, 2024.

(Continued)

*Primary Examiner* — Gbemileke J Onamuti
(74) *Attorney, Agent, or Firm* — BAYES PLLC

(57)     ABSTRACT

Provided in the embodiments of the present application are a wireless communication method and a device. The method comprises: a first terminal receiving sidelink data, which is sent by a second terminal on a plurality of carriers; and according to at least one of the following: the plurality of carriers, first indication information, carrier configuration information of a PSFCH, and a CBR, the first terminal selecting at least one carrier for transmitting the PSFCH.

14 Claims, 9 Drawing Sheets

(56)         References Cited

FOREIGN PATENT DOCUMENTS

WO      2018145296 A1      8/2018
WO      2021018096 A1      2/2021

OTHER PUBLICATIONS

3GPP TSG-RAN WG2 #83; Barcelona, Spain, Aug. 19-23, 2013; R2-132445; Title: Discussion of control paths for D2D communications; Source: BlackBerry UK Limited.
International Search Report issued in International application No. PCT/CN2021/089013, mailed Dec. 27, 2021.
Written Opinion of the International Searching Authority issued in International application No. PCT/CN2021/089013, mailed Dec. 27, 2021.
First Office Action issued in corresponding European application No. 21937344.6, mailed on Feb. 11, 2025, 6 pages.

* cited by examiner

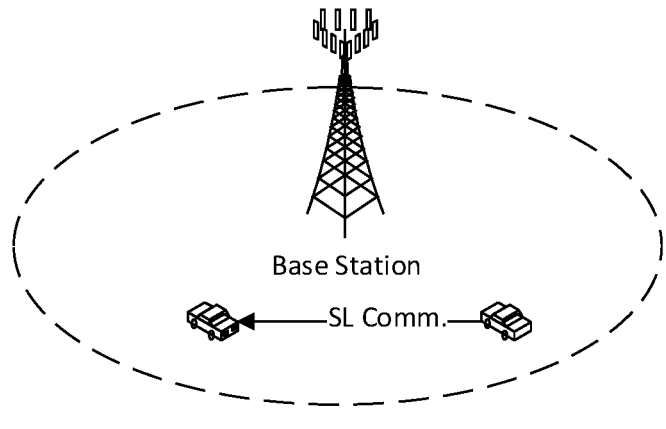
FIG. 1
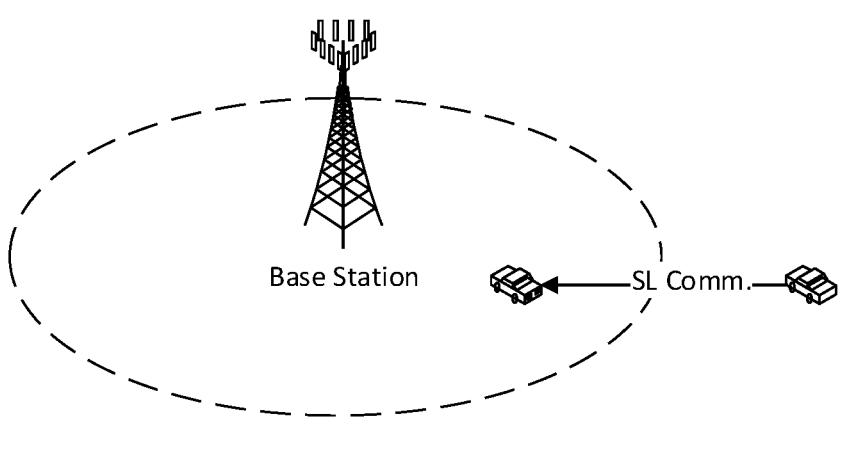
FIG. 2
FIG. 3

UE1                          UE2

Data

WIRELESS COMMUNICATION METHOD, AND DEVICE

CROSS-REFERENCE TO RELATED APPLICATION

The present application is a continuation application of International Application No. PCT/CN2021/089013, filed on Apr. 22, 2021, and the entire contents thereof are incorporated herein by reference.

TECHNICAL FIELD

The embodiments of the present application relate to the communication field, and more specifically, to a wireless communication method and device.

BACKGROUND

In the new radio (NR)-vehicle to everything (V2X), in order to improve reliability, a sidelink feedback channel is introduced. For example, for unicast transmission, the sending terminal sends sidelink data to the receiving terminal, and the receiving terminal sends Hybrid Automatic Repeat request (HARQ) feedback information to the sending terminal, such as acknowledge (Acknowledge, ACK) information or negative acknowledge (NACK) information, the sending terminal judges whether it needs to retransmit the sidelink data according to the feedback information of the receiving terminal. Wherein, the HARQ feedback information is carried in the sidelink feedback channel, such as a physical sidelink feedback channel (PSFCH).

At present, the transmission of the sidelink data adopts a single-carrier transmission mode. Correspondingly, when sending the PSFCH, the terminal at the receiving end uses the same carrier as that of the sidelink data for information transmission.

SUMMARY

Embodiments of the present application provides a method and device for wireless communication.

In a first aspect, a wireless communication method is provided, including: a first terminal receive sidelink data sent by a second terminal on multiple carriers; and the first terminal selects at least one carrier for transmission a PSFCH according to at least one of first indication information, carrier configuration information of the PSFCH, CBR and the multiple carriers; wherein, the PSFCH is configured to carry sidelink feedback information of the sidelink data, and the first indication information is configured to indicate at least one carrier for transmitting the PSFCH.

In a second aspect, a wireless communication method is provided, including: a second terminal sends sidelink data to a first terminal on multiple carriers; and the second terminal sends first indication information to the first terminal, or the sidelink data includes the first indication information; wherein, the first indication information is configured to indicate at least one carrier for transmitting a PSFCH, and the PSFCH is configured to carry sidelink feedback information of the sidelink data.

In a third aspect, there is provided a terminal device, the terminal device is a first terminal, including: a communication unit and a processing unit, the communication unit is configured to receive sidelink data sent by a second terminal on multiple carriers; and the processing unit is configured to select at least one carrier for transmission a PSFCH according to at least one of first indication information, carrier configuration information of the PSFCH, CBR, and the multiple carriers; wherein, the PSFCH is configured to carry sidelink feedback information of the sidelink data, and the first indication information is configured to indicate at least one carrier for transmitting the PSFCH.

In a fourth aspect, a terminal device is provided, the terminal device is a second terminal, and includes: a communication unit configured to: send sidelink data to a first terminal on multiple carriers; and send first indication information to the first terminal, or, the sidelink data includes first indication information; wherein, the first indication information is configured to indicate at least one carrier for transmitting a PSFCH, and the PSFCH is configured to carry sidelink feedback information of the sidelink data.

In a fifth aspect, a terminal device is provided, including a processor and a memory. The memory is configured to store a computer program, and the processor is configured to call and run the computer program stored in the memory to execute the method in the above first aspect or its implementable manner.

In a sixth aspect, a terminal device is provided, including a processor and a memory. The memory is configured to store a computer program, and the processor is configured to call and run the computer program stored in the memory to execute the method in the above second aspect or its implementable manner.

In a seventh aspect, an apparatus is provided for realizing the method in any one of the first aspect to the second aspect above.

Specifically, the apparatus includes: a processor, configured to call and run a computer program from a memory, to cause a device installed with the apparatus to execute the method in any one of the first aspect to the second aspect above.

In an eighth aspect, there is provided a computer-readable storage medium for storing a computer program, and the computer program causes a computer to execute the method in any one of the above first to second aspects or in each implementation manner thereof.

In a ninth aspect, a computer program product is provided, including computer program instructions, the computer program instructions cause a computer to execute the method in any one of the above first to second aspects or in each implementation manner thereof.

In a tenth aspect, a computer program is provided, which, when running on a computer, causes the computer to execute the method in any one of the first to second aspects above or in each implementation manner thereof.

BRIEF DESCRIPTION OF THE DRAWINGS

FIG. 1 is a schematic diagram of sidelink communication within network coverage provided by the present application;

FIG. 2 is a schematic diagram of sidelink communication in partial network coverage provided by the present application;

FIG. 3 is a schematic diagram of sidelink communication outside network coverage provided by the present application;

FIG. 19 illustrates a schematic block diagram of a second terminal 1900 according to an embodiment of the present application;

DETAILED DESCRIPTION

Figure 4:
FIG. 4 is a schematic diagram of unicast transmission provided by the embodiment of the present application.

Hereinafter, the technical solutions in the embodiments of the present application will be described with reference to the drawings in the embodiments of the present application. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

Before introducing the technical solution of this application, the relevant knowledge of the technical solution of this application will be described below:

1. Sidelink Communication Under Different Network Coverage Environments

In sidelink communication, according to the network coverage of the communicating terminal, it can be classified into sidelink communication within network coverage, sidelink communication with partial network coverage, and sidelink communication outside network coverage, as shown in FIG. 1, FIG. 2, and FIG. 3 respectively.

As shown in FIG. 1, in the sidelink communication within network coverage, all terminals performing sideline communication are within the coverage of the same base station, so that all the above-mentioned terminals can receive configuration signaling from the base station, and perform sidelink communication based on the same sidelink configuration.

As shown in FIG. 2, in the sidelink communication with partial network coverage, some terminals performing sidelink communication are located within the coverage of the base station, and these terminals can receive the configuration signaling of the base station, and perform sidelink communication according to the configuration of the base station. However, terminals outside the network coverage cannot receive configuration signaling from the base station. In this case, the terminals outside the network coverage will determine the sidelink configuration based on the pre-configuration information and the information carried in the physical sidelink broadcast channel (PSBCH) sent by the terminals within the network coverage, to perform sidelink communication.

As shown in FIG. 3, for the sidelink communication outside network coverage, all terminals performing sidelink communications are located outside the network coverage, and all terminals determine sidelink configurations according to preconfigured information to perform sidelink communications.

2. Device to Device (D2D)/V2X

Device-to-device communication is a sidelink transmission technology based on D2D. It is different from the way communication data is received or sent by base stations in traditional cellular systems, so it has higher spectral efficiency and lower transmission delay. The Internet of Vehicles system adopts a terminal-to-terminal direct communication method, and two transmission modes are defined in the 3rd generation partnership project (3GPP): the mode 1 and the mode 2.

The mode 1: the transmission resources of the terminal are allocated by the base station, and the terminal sends data on the sidelink according to the resources allocated by the base station; the base station can allocate resources for a single transmission to the terminal, and can also allocate semi-static transmission to the terminal. As shown in FIG. 1, the terminal is located within the coverage of the network, and the network allocates transmission resources for sidelink transmission to the terminal.

The mode 2: the terminal selects a resource from the resource pool for data transmission. As shown in FIG. 3, the terminal is located outside the coverage area of the cell, and the terminal independently selects transmission resources from the pre-configured resource pool for sidelink transmission; or as shown in FIG. 1, the terminal independently selects transmission resources for sidelink transmission from the resource pool configured by the network transmission;

In NR-V2X, autonomous driving needs to be supported, so higher requirements are placed on data interaction between vehicles, such as higher throughput, lower latency, higher reliability, greater coverage, more flexible resource allocation, etc.

Figure 5:
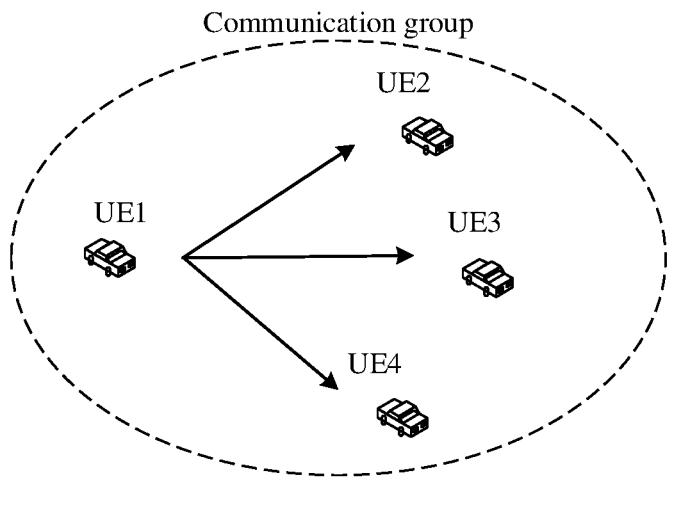
FIG. 5 is a schematic diagram of multicast transmission provided by an embodiment of the present application.
Figure 6:
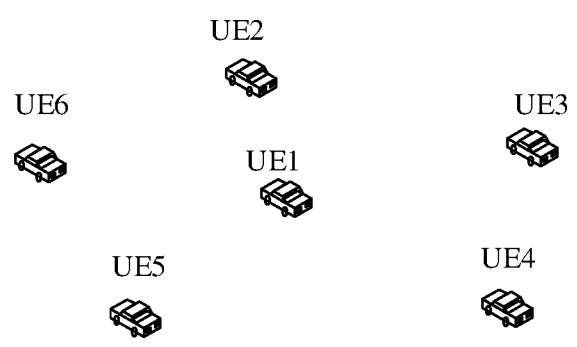
FIG. 6 is a schematic diagram of broadcast transmission provided by the embodiment of the present application.

In LTE-V2X, broadcast transmission is supported, and in NR-V2X, unicast and multicast transmission are introduced. For unicast transmission, there is only one terminal at the receiving end, as shown in FIG. 4, unicast transmission is performed between UE1 and UE2; for multicast transmission, the receiving end is all the terminals within a communication group, or all the terminals in a certain transmission distance, as shown in FIG. 5, UE1, UE2, UE3 and UE4 form a communication group, in which UE1 sends data, and other terminal devices in this group are receiver terminals. For broadcast transmission mode, the receiver is any terminal around the sender terminal, as shown in FIG. 6, UE1 is the sending end terminal, and other terminals around it, UE2-UE6, are all receiving end terminals.

3. NR-V2X System Frame Structure

Figure 7A:
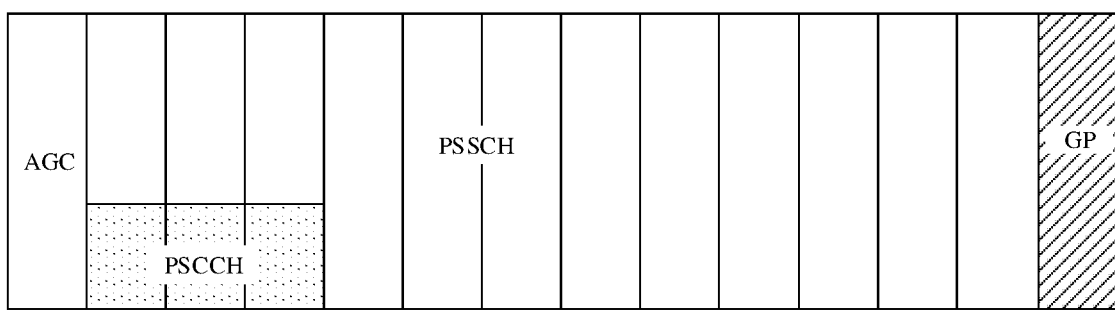
FIG. 7A is a schematic diagram of a time slot structure in NR-V2X provided by this application.
Figure 7B:
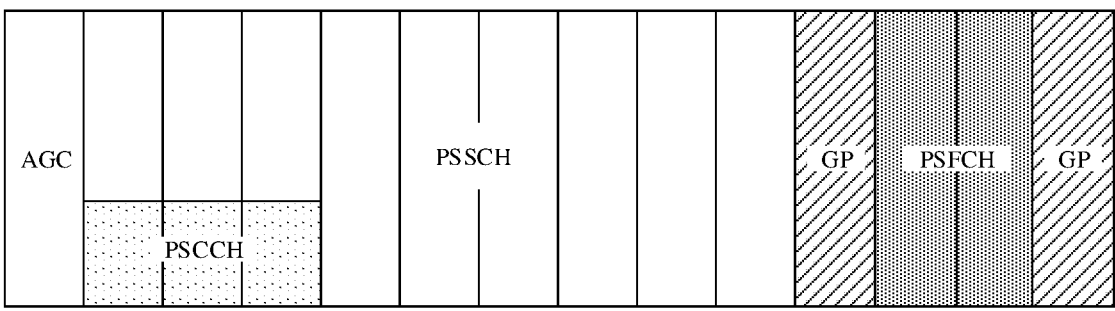
FIG. 7B is a schematic diagram of another time slot structure in NR-V2X provided by the present application.

The time slot structure in NR-V2X is shown in FIG. 7A and FIG. 7B: FIG. 7A shows the time slot structure not including the PSFCH channel in the time slot; and FIG. 7B shows the time slot structure including the PSFCH channel. In NR-V2X, the physical sidelink control channel (PSCCH) starts from the second sidelink symbol of the time slot in the time domain and occupies 2 or 3 orthogonal frequency division multiplexing (OFDM) symbols, and can occupy {10, 12 15, 20, 25} physical resource blocks (PRB) in the frequency domain. In order to reduce the complexity of the UE's blind detection of the PSCCH, only one number of PSCCH symbols and one number of PRBs are allowed to be configured in one resource pool. In addition, because the sub-channel is the minimum granularity of resource allocation for the physical sidelink shared channel (PSSCH) in NR-V2X, the number of PRBs occupied by the PSCCH must be less than or equal to the number of PRBs included in one sub-channel in the resource pool, so as to avoid additional restrictions on PSSCH resource selection or allocation. In the time domain, the PSSCH also starts from the second sidelink symbol of the time slot, the last time domain symbol in the time slot is a guard period (GP) symbol, and the remaining symbols are mapped to the PSSCH. The data on the first sidelink symbol in this time slot is the repetition of the data on the second sidelink symbol. Generally, the receiving terminal uses the first sidelink symbol as an automatic gain control (AGC) symbol, and the data on this symbol is usually not used for data demodulation. The PSSCH occupies P subchannels in the frequency domain, and each subchannel includes Q consecutive PRBs. As shown in FIG. 7A.

When a time slot includes a PSFCH channel, the second-to-last and third-to-last symbols in the time slot are used for PSFCH channel transmission, and a time-domain symbol before the PSFCH channel is used as a GP symbol, as shown in FIG. 7B.

4. 2-Order Sidelink Control Information (SCI) Mechanism in NR-V2X

Figure 8:
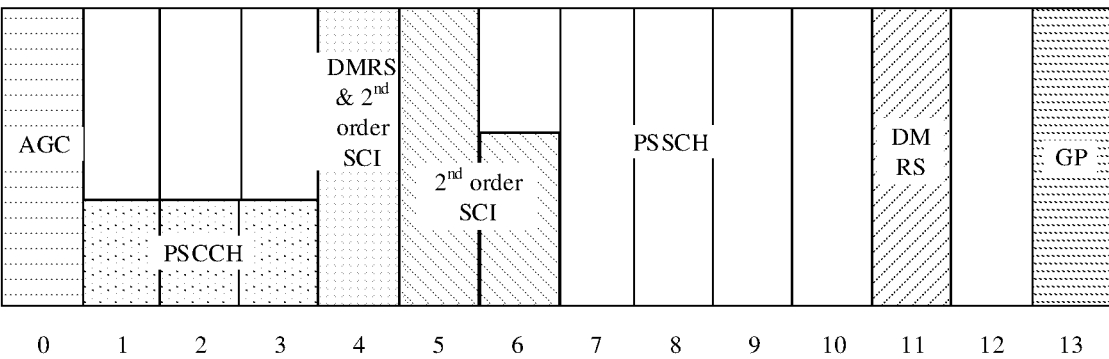
FIG. 8 is a schematic diagram of resource mapping of the second-order SCI provided by the present application.

In NR-V2X, the 2-order SCI is introduced, the first-order SCI is carried by the PSCCH, and is used to indicate the information of the PSSCH such as the transmission resource, reserved resource information, modulation and coding scheme (MCS) level, priority and the like. The second-order SCI is sent in the resources of the PSSCH, and is demodulated using the demodulation reference signal (DMRS) of the PSSCH, to indicate the information for data demodulation such as the source identifier (ID), the target ID, the hybrid automatic repeat request (HARQ) ID, the new data indicator (NDI), and the like. The second-order SCI is mapped from the first DMRS symbol of the PSSCH, and firstly mapped in frequency domain, and then in time domain. As shown in FIG. 8, the PSCCH occupies three symbols (symbols 1, 2 and 3), and the DMRS of the PSSCH occupies symbols 4 and 11, the second-order SCI is mapped from the symbol 4, and is frequency-division multiplexed with the DMRS on symbol 4. The second-order SCI is mapped to symbols 4, 5 and 6, and the size of resources occupied by the second-order SCI depends on the number of bits of the second-order SCI.

5. Sidelink Feedback Channel

Figure 9:
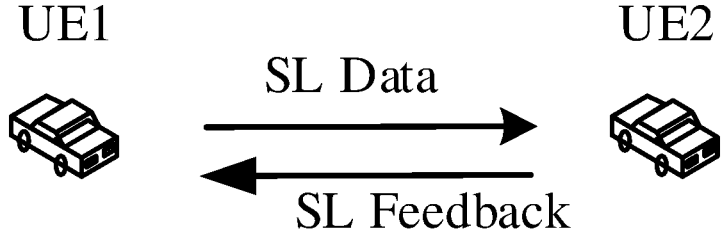
FIG. 9 is a schematic diagram of sidelink feedback provided by the present application.

In NR-V2X, in order to improve reliability, a sidelink feedback channel is introduced, as shown in FIG. 9. For example, for unicast transmission, the transmitting terminal sends sidelink data (including PSCCH and PSSCH) to the receiving terminal, and the receiving terminal sends HARQ feedback information (including ACK or NACK) to the transmitting terminal, and the transmitting terminal judges whether retransmission is required according to the received feedback information of the receiving terminal. Wherein, the HARQ feedback information is carried in the sidelink feedback channel, such as PSFCH.

The sidelink feedback can be activated or deactivated through pre-configuration information, network configuration information, or SCI sent by the sender. If the sidelink feedback is activated, the receiver terminal receives the sidelink data sent by the sender terminal, and feeds back ACK or NACK to the sender according to the detection result. The transmitting terminal decides to send retransmission data or new data according to the feedback information of the receiving terminal. If the sideline feedback is deactivated, the receiving terminal does not need to send feedback information, and the transmitting terminal usually adopts blind retransmission to send data, for example, the sending terminal repeats sending K times for each sidelink data, instead of deciding whether to send retransmission data according to the feedback information of the receiving terminal.

6. Sidelink Feedback Channel Format

Figure 10:
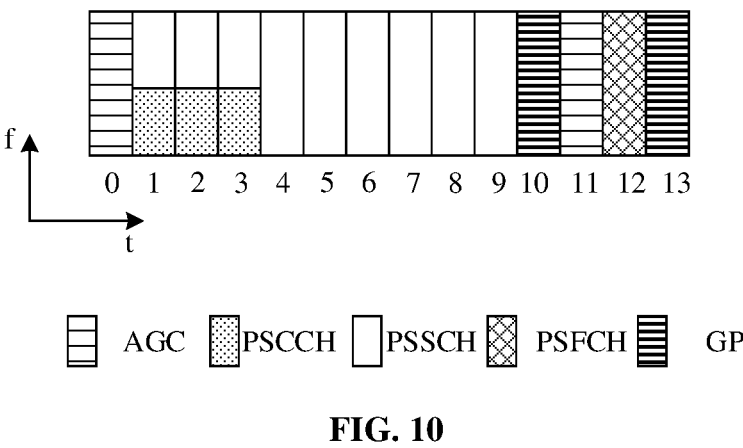
FIG. 10 is a schematic diagram of the time slot structure of PSFCH and PSSCH/PSCCH provided by the present application.

In NR-V2X, the sideline feedback channel PSFCH is introduced. The PSFCH only carries 1 bit of sideline feedback information and occupies 2 time domain symbols in the time domain (the second symbol carries the sideline feedback information, and the data on the first symbol is a copy of the data on the second symbol, which is usually used as AGC), and occupies 1 PRB in the frequency domain. In a time slot, the structures of PSFCH and PSSCH/PSCCH are shown in FIG. 10, and FIG. 10 schematically shows positions of time-domain symbols occupied by PSFCH, PSCCH, and PSSCH in a time slot. In a slot, the last symbol is used as GP; the last but one symbol is used for PSFCH transmission; the last but two symbol data is the same as the PSFCH symbol data, and is used as AGC; the last but three symbol is also used as GP; the first symbol in the time slot is used as AGC, and the data on this symbol is the same as the data on the second time domain symbol in this time slot; the PSCCH occupies 3 time domain symbols; and the remaining symbols can be used for PSSCH transmission.

7. Sidelink Feedback Channel Resource

Figure 11:
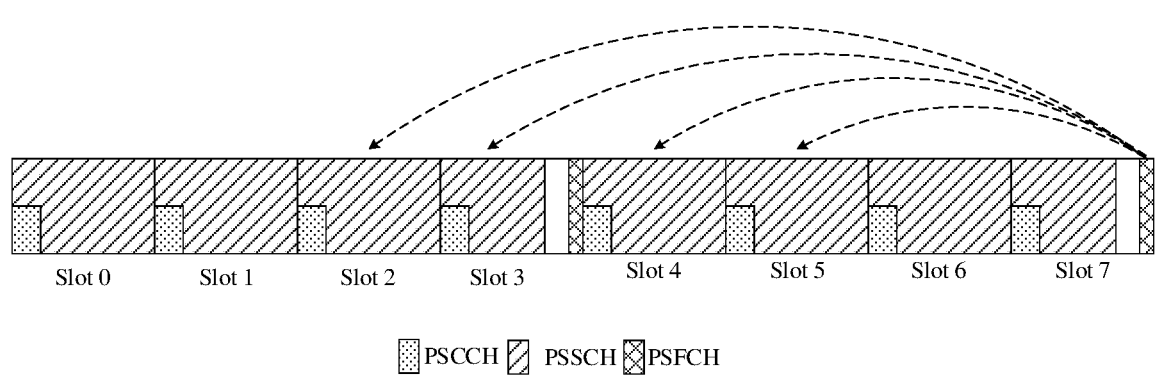
FIG. 11 is a schematic diagram of PSFCH resource configuration provided by the present application.

In order to reduce the overhead of the PSFCH channel, one of the N slots is defined to include the PSFCH transmission resource, that is, the period of the sidelink feedback resource is N slots, wherein N=1, 2, 4, and the parameter N is the preconfigured or network configured. As shown in FIG. 11, where N=4, in this embodiment, the feedback information of the PSSCHs transmitted in time slots 2, 3, 4, and 5 is all transmitted in time slot 7, so the time slots {2, 3, 4, 5} can be taken as a time slot set, and the corresponding PSFCH of the PSSCH transmitted in the time slot set is in the same time slot.

Figure 12:
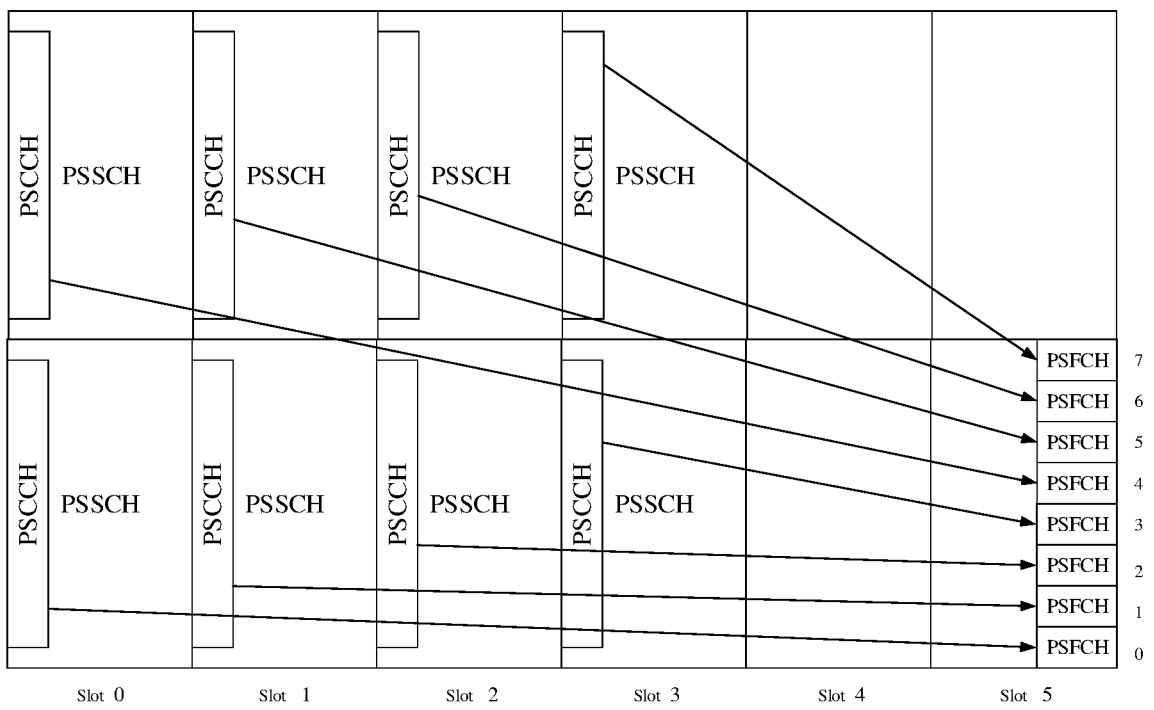
FIG. 12 is a schematic diagram of the resource correspondence between PSFCH and sidelink data provided by the present application.

The resource of the sidelink feedback channel may be determined according to the time slot where the sidelink data (including PSCCH and PSSCH) is located, and the starting position of the occupied subband. As shown in FIG. 12, where N=4, the sidelink data transmitted at the same subband starting position in different time slots correspond respectively to different PSFCH resources in the feedback time slots.

In short, at present, the sidelink data transmission adopts a single-carrier transmission mode. Correspondingly, the receiving terminal uses the same carrier as the sidelink data for information transmission when sending the PSFCH. However, in order to improve the throughput of the sidelink transmission system, multi-carrier transmission can be supported on SL, that is, the sidelink data of the terminal can be transmitted on multiple carriers. In this case, how to select a carrier for transmitting the PSFCH is a technical problem to be solved urgently in this application.

In order to solve the above-mentioned technical problems, in this application, the receiving end terminal can select the carrier for transmitting the PSFCH according at least one of the following four items: at least one carrier for transmitting the sidelink data, first indication information, carrier configuration information of the PSFCH, and channel busy ratio (CBR). In the embodiment, the first indication information is configured to indicate at least one carrier for transmitting the PSFCH.

It should be understood that the terminal device in this embodiment of the present application may also be referred to as user equipment (UE), access terminal, subscriber unit, subscriber station, mobile station, mobile site, remote station, remote terminal, mobile device, user terminal, wireless communication device, terminal, user agent or user device, etc. The terminal device can be a station (ST) in a WLAN, a cellular phone, a cordless phone, a session initiation protocol (SIP) phone, a wireless local loop (WLL) station, a personal digital assistant (PDA) devices, a handheld device with wireless communication function, a computing device or other processing device connected to wireless modem, a vehicle-mounted device, a wearable device, and the terminal in the next-generation communication system, such as NR networks or the terminal in future evolved public land mobile network (PLMN) network, etc.

As an example but not a limitation, in this embodiment of the present application, the terminal device may also be a wearable device. The wearable device can also be referred to as a wearable smart device, which is a general term of the wearable devices intelligently designed and developed by the application of wearable technology to daily wearing, such as glasses, gloves, watches, clothing and shoes. A wearable device is a portable device that is worn directly on the body or integrated into the users clothing or accessories. The wearable device is not only a hardware device, but also achieve powerful functions through software support, data interaction, and cloud interaction. Generalized wearable smart devices include those of full-featured, large-sized, fully or partly functional without relying on smart phones, such as smart watches or smart glasses, etc., and those only focus on a certain type of application functions, and need to cooperate with other devices such as smart phones, such as various smart bracelets and smart jewelry for physical sign monitoring.

It should be understood that the "indication" mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association between A and B.

In the description of the embodiments of the present application, the term "corresponding" may indicate that there is a direct or indirect correspondence between the two, or that there is an association between the two, or the relation such as indicating and being indicated, configuring and being configured, etc.

The technical scheme of the present application will be described in detail below.

It should be noted that the first terminal referred to in the following embodiments is also referred to as a receiving terminal, and the second terminal is also referred to as a transmitting terminal, which will not be repeated below.

Figure 13:
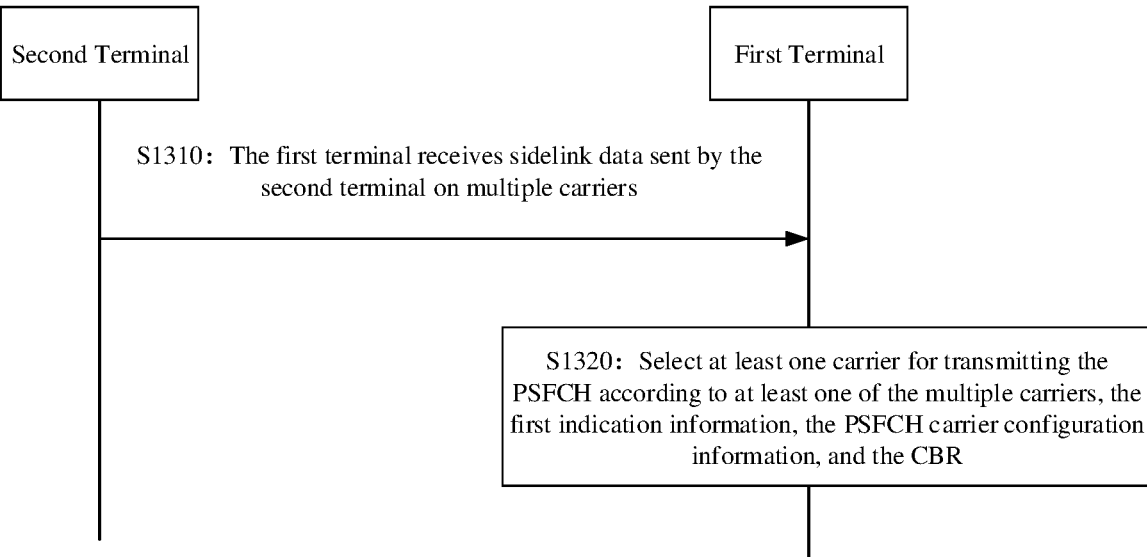
FIG. 13 is an interaction flowchart of a wireless communication method 1300 provided in an embodiment of the present application.

FIG. 13 is an interaction flowchart of a wireless communication method 1300 provided in the embodiment of the present application. As shown in FIG. 13, the method includes the following steps:

S1310: The first terminal receives sidelink data sent by the second terminal on multiple carriers.

S1320: The first terminal selects at least one carrier for transmitting the PSFCH according to at least one of the first indication information, the PSFCH carrier configuration information, the CBR, and the multiple carriers.

Figure 14:
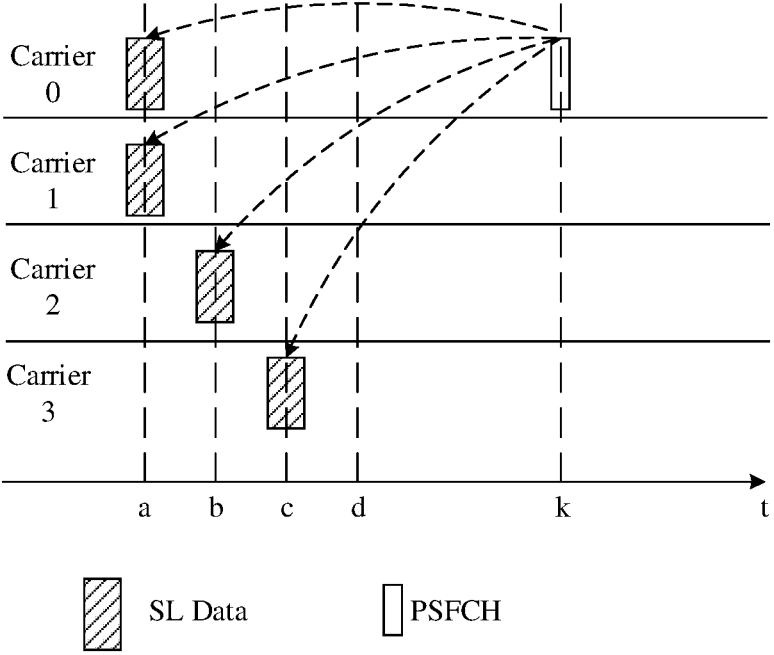
FIG. 14 is a schematic diagram of a first terminal sending a PSFCH on a carrier provided by an embodiment of the present application.

Optionally, the sidelink data sent on multiple carriers includes: sidelink data sent at the same time, and/or sidelink data not sent at the same time. For example: FIG. 14 is a schematic diagram of the first terminal sending PSFCH on a carrier provided by the embodiment of the present application. As shown in FIG. 14, for the sidelink data sent at time slots a, b, c, and d, their corresponding PSFCHs are all on slot k, that is, slot k corresponds to the slot set {a,b,c,d}. At time slot a, the second terminal simultaneously sends sidelink data on carrier 0 and carrier 1, that is, sidelink data sent on multiple carriers includes: sidelink data sent simultaneously. At time slot b, the second terminal sends data on carrier 2, and in time slot c, the second terminal sends data on carrier 3, that is, the sidelink data sent on multiple carriers includes: sidelink data not sent at the same time.

Optionally, the sidelink data sent on multiple carriers belong to the same data block or different data blocks. In the embodiment, the sidelink data sent on multiple carriers belonging to the same data block may be understood as: the sidelink data sent on multiple carriers are different redundant versions of the same data block.

It should be understood that the foregoing PSFCH is used to carry sidelink feedback information of the foregoing sidelink data sent on multiple carriers.

It should be understood that the sidelink feedback information corresponding to the above sidelink data sent on the multiple carriers may be carried in one PSFCH, or the sidelink feedback information corresponding to each sidelink data may be carried in separate PSFCH, or, the sidelink feedback information corresponding to some sidelink data in the sidelink data sent on multiple carriers is carried in one PSFCH, and the sidelink feedback information corresponding to each sidelink data in the remaining sidelink data is carried in separate PSFCH. In this application, there is no restriction on the correspondence between the sidelink feedback information corresponding to the sidelink data sent on multiple carriers and the PSFCH. Based on this, there may be one or more PSFCHs, which is not limited in this application.

Optionally, the first indication information is used to indicate at least one carrier for transmitting the PSFCH.

Optionally, the PSFCH carrier configuration information is used to configure the first carrier set for transmitting the PSFCH.

It should be understood that the PSFCH carrier configuration information is also described as being used to configure the carrier for transmitting the PSFCH. For example, the carrier configuration information of the PSFCH is used to indicate the set of carriers supported by the sidelink transmission, and one or more carriers in the set of carriers are configured as carriers that can be used to transmit the PSFCH. For another example, the first configuration information configures the carrier set supported by the sidelink transmission, and the PSFCH carrier configuration information configures one or more carriers in the carrier set as carriers that can be used to transmit the PSFCH.

Optionally, the above CBR may be the CBR of the resource pools on the above multiple carriers, or may be the CBR of the resource pools on all carriers supported by the sidelink transmission between the first terminal and the second terminal, which is not limited by this application.

It should be understood that there may be one or more carriers finally determined by the first terminal for transmitting the PSFCH, for example, in FIG. 14, an example in which one carrier is used for transmitting the PSFCH is shown.

Optionally, the carrier for transmitting the first sidelink data is different from the carrier for transmitting the PSFCH corresponding to the first sidelink data; wherein, the first sidelink data is one piece of the sidelink data sent on the multiple carriers. For example: as shown in FIG. 14, for the sidelink data transmitted by the second terminal at time slot a on carrier 1, its corresponding PSFCH is transmitted on carrier 0. Similarly, for the sidelink data sent by the second terminal at time slot b on carrier 2, its corresponding PSFCH is transmitted on carrier 0. For the sidelink data sent by the second terminal at time slot c on carrier 3, its corresponding PSFCH is transmitted on carrier 0.

Optionally, the carrier for transmitting the second sidelink data is the same carrier as the carrier for transmitting the PSFCH corresponding to the second sidelink data; wherein, the second sidelink data is one piece of the sidelink data sent on the multiple carriers. For example, as shown in FIG. 14, for the sidelink data sent by the second terminal at time slot a on carrier 0, its corresponding PSFCH is transmitted on carrier 0.

It should be noted that the technical solution of this application can also be extended to the second terminal sending sidelink data to the first terminal on one carrier, and at this time, the first terminal can also select a carrier for transmitting PSFCH according to at least one of: the carrier, the first indication information, the carrier configuration information of the PSFCH, or the CBR. In this case, the carrier for transmitting the sidelink data may be different from the carrier for transmitting the PSFCH.

To sum up, in this application, the first terminal may select at least one carrier for transmitting the PSFCH according to at least one of the first indication information, the PSFCH carrier configuration information, the CBR, and the plurality of carriers.

Hereinafter, description will be made on how the first terminal selects at least one carrier for transmitting the PSFCH according to at least one of the first indication information, the PSFCH carrier configuration information, the CBR, and the plurality of carriers.

Example 1

Figure 15:
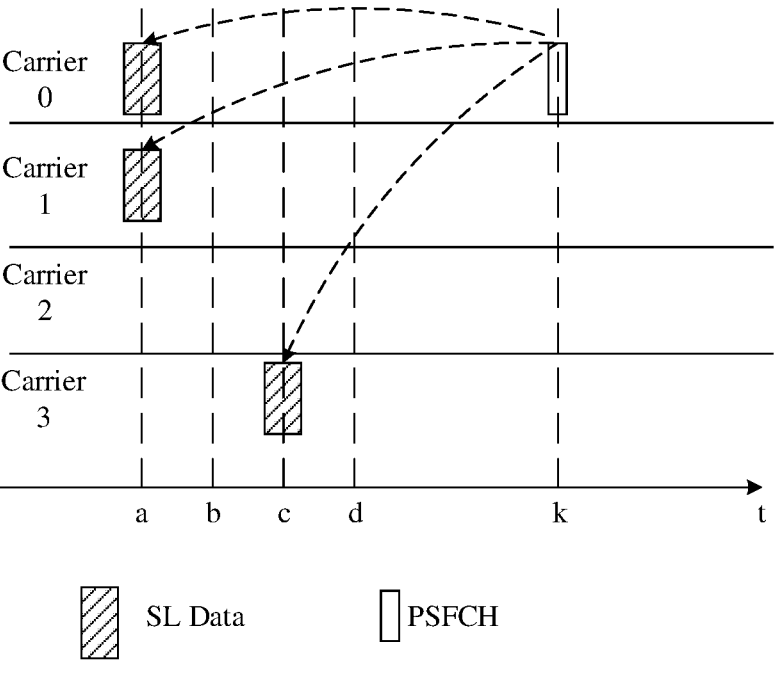
FIG. 15 is a schematic diagram of at least one carrier selected by the first terminal for transmitting PSFCH according to multiple carriers according to the embodiment of the present application.

Optionally, the first terminal selects at least one carrier used to transmit the PSFCH among the plurality of carriers. For example: as shown in FIG. 15, the second terminal sends sidelink data at time slot a on carrier 0 and carrier 1, sends sidelink data at time slot c on carrier 3, and does not send sidelink data at time slot b and time slot d. The first terminal sends PSFCH for the sidelink data sent by the second terminal at time slot k, and the first terminal can only select carriers from carrier 0, carrier 1, and carrier 3, but not carrier 2, to transmit the PSFCH.

Example 2

Optionally, the first terminal selects at least one carrier for transmitting the PSFCH according to the first indication information.

Optionally, the first indication information includes index information, and the first terminal selects at least one carrier for transmitting the PSFCH according to the index information.

Optionally, the index information may be index information corresponding to one or more carriers, for example: carrier 0 and carrier 1 correspond to index 0, when the first terminal obtains index 0, it means that the first terminal can transmit the PSFCH on the carrier 0 and carrier 1.

Assuming that the system supports three sidelink carriers, and the first terminal obtains the corresponding relationship between the index information and the carriers through pre-configuration information or network configuration information, as shown in Table 1. The first terminal can use the index information in the first indication information and the corresponding relationship shown in Table 1 to select the carrier corresponding to the index information as the carrier for transmitting the PSFCH.

TABLE 1

Correspondence between index information and carrier

| | Index information | | | | | | | |
|---|---|---|---|---|---|---|---|---|
| | 0 | 1 | 2 | 3 | 4 | 5 | 6 | 7 |
| Carrier | Carrier 0 | Carrier 1 | Carrier 2 | Carrier 0 and Carrier 1 | Carrier 0 and Carrier 2 | Carrier 1 and Carrier 2 | Carrier 0, Carrier 1 and Carrier 2 | Reserved (N/A) |

Optionally, the index information may also be carrier index information, in the embodiment, there is a one-to-one correspondence between carriers and carrier index information, for example: carrier index information is 0, corresponding to carrier 0, carrier index information is 1, corresponding to carrier 1. When the first terminal obtains the index 0, it means that the first terminal can transmit the PSFCH on the carrier 0. When the first terminal obtains the index 1, it means that the first terminal can transmit the PSFCH on the carrier 1.

Optionally, the first indication information includes one or more pieces of index information used to indicate the carrier for transmitting the PSFCH.

Optionally, the first indication information is carried in any of but not limited to: sidelink control information (SCI), PC5-RRC signaling, media access control control element (MAC CE). In the embodiment, the SCI includes first-order SCI or second-order SCI.

Figure 16:
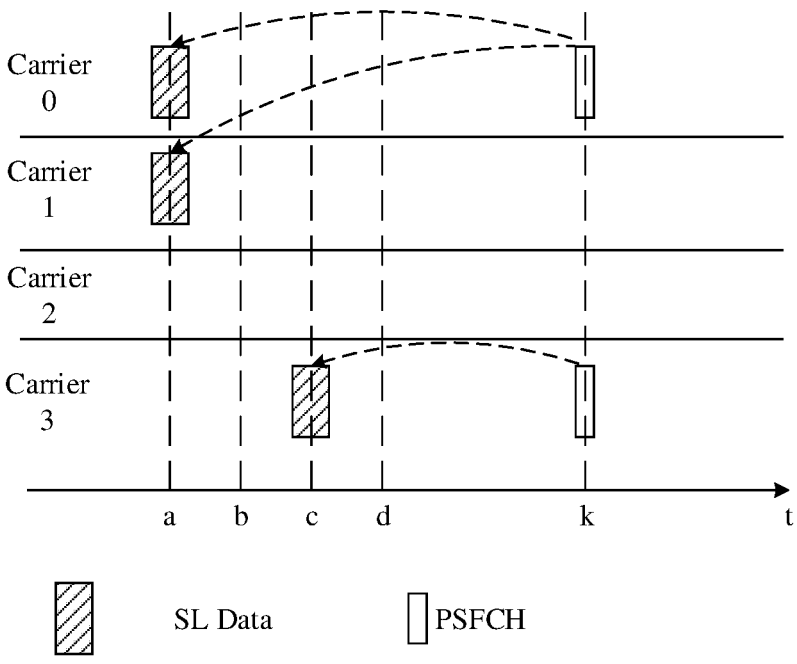
FIG. 16 is a schematic diagram of at least one carrier selected by the first terminal for transmitting PSFCH according to the first indication information according to the embodiment of the present application.

For example, as shown in FIG. 16, the second terminal transmits sidelink data at time slot a on carrier 0, for simplicity, this sidelink data can be referred to as the first sidelink data, and transmits sidelink data at time slot 0 on carrier 1, for simplicity, this sideline data can be referred to as the second sideline data. Also, the second-order SCI in the first sideline data and the second sideline data carries the first indication information, the first indication information includes the index of carrier 0. The second terminal transmits sidelink data at time slot c on carrier 3, for simplicity, this sidelink data can be referred to as the third sidelink data. Also, the second-order SCI in the third sidelink data carries the first indication information, and the first indication information includes the index of carrier 3. Therefore, when the first terminal sends the sidelink feedback information for the above-mentioned 3 pieces of sidelink data in time slot k, the PSFCH corresponding to the first sidelink data and the second sidelink data is sent on the carrier 0, and the PSFCH corresponding to the third sidelink data is sent on the carrier 3.

For another example, when the first terminal and the second terminal perform unicast communication, during the process of establishing the unicast communication link, the first terminal and the second terminal configure parameters for sidelink transmission through PC5-RRC signaling. Optionally, the first indication information is included in the PC5-RRC signaling. Optionally, in this case, the first indication information is generated by the first terminal or obtained from the second terminal. When the first terminal and the second terminal complete the unicast communication link establishment process and start the sidelink communication, if the first terminal receives the sidelink data sent by the second terminal, the first terminal determines the carrier for sending the PSFCH according to the first indication information in the PC5-RRC signaling. For example, the first terminal selects the carrier indicated by the first indication information in the PC5-RRC signaling as the carrier for sending the PSFCH.

Example 3

Optionally, the first terminal selects at least one carrier for transmitting the PSFCH according to the carrier configuration information of the PSFCH, that is, the first terminal selects at least one carrier for transmitting the PSFCH in the first carrier set configured by the carrier configuration information of the PSFCH.

For example, the network configures 4 carriers for sidelink transmission through radio resource control (RRC)

signaling, such as carriers 0-3; and configures carrier 0 and carrier 1 for PSFCH transmission through the carrier configuration information of the PSFCH. Therefore, when receiving sidelink data on carriers 0-3, the first terminal can only select one or two of carriers 0 and 1 to transmit the PSFCH. In the embodiment, the RRC signaling used to configure the sidelink transmission carrier and the carrier configuration information of the PSFCH may be the same signaling or different signaling.

Figure 17:
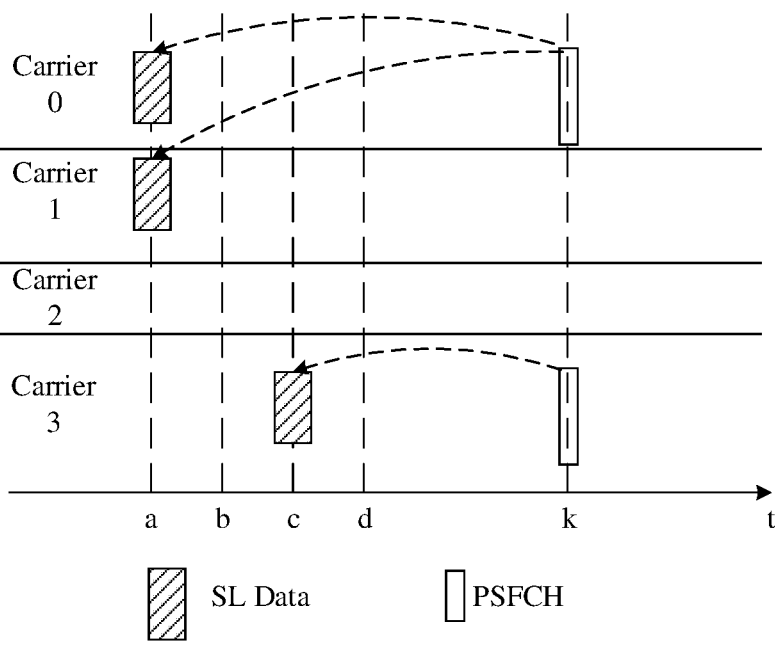
FIG. 17 is a schematic diagram of at least one carrier selected by the first terminal for transmitting the PSFCH according to the carrier configuration information of the PSFCH provided by the embodiment of the present application.

For another example, the network configures 4 carriers for sidelink transmission through RRC signaling, such as carriers 0-3, and configures the resource pools on each carrier through RRC signaling, and configures the transmission resource of the PSFCH only in the resource pools on carrier 0 and carrier 3, then the first terminal can only use carrier 0 and carrier 3 to send PSFCH when receiving sidelink data on each carrier, as shown in FIG. 17.

Optionally, the carrier configuration information of the PSFCH is pre-configuration information or network configuration information.

Optionally, when the carrier configuration information of PSFCH is network configuration information, the configuration information may be carried in but not limited to anyone of: system information block (SIB) information, RRC signaling or downlink control information (DCI).

Example 4

Optionally, the first terminal selects at least one carrier for transmitting the PSFCH according to the CBR.

In an implementable manner, the CBR is the CBR of each resource pool on the second carrier set, and the second carrier set includes all carriers supported by the sidelink transmission between the first terminal and the second terminal, or the second carrier set includes all carriers supported by sidelink transmission.

In this case, the first terminal may select at least one carrier for transmitting the PSFCH from the second carrier set in the order of CBR from low to high. For example: the first terminal determines to transmit PSFCH on one carrier, and the first terminal selects the carrier with the smallest CBR from the second carrier set to transmit PSFCH. Alternatively, the first terminal determines to transmit the PSFCH on two carriers, and the first terminal selects the carrier with the smallest and second smallest CBR from the second carrier set to transmit the PSFCH.

Optionally, the first terminal may also select the carrier smaller than the first threshold in the second carrier set as candidate carrier, and select at least one carrier used to transmit the PSFCH from the candidate carrier. In the embodiment, the first threshold is a threshold determined according to pre-configuration information or network configuration information.

In another possible implementation manner, the first terminal selects at least one carrier for transmitting the PSFCH among the multiple carriers according to the order of the CBRs of the multiple carriers from low to high. That is, among the multiple carriers receiving the sidelink data sent by the second terminal, the first terminal selects at least one carrier for transmitting the PSFCH among the multiple carriers in the order of the CBR of the multiple carriers from low to high. For example: the first terminal selects the carrier with the smallest CBR among the multiple carriers to transmit the PSFCH. Or, the first terminal selects the carrier with the smallest and second smallest CBR among the plurality of carriers to transmit the PSFCH.

In yet another possible implementation manner, the first terminal determines a set formed by the carrier whose CBR is smaller than the second threshold among the multiple carriers as the third carrier set. The first terminal selects at least one carrier for transmitting the PSFCH in the third carrier set. In the embodiment, the second threshold is a threshold determined according to pre-configuration information or network configuration information.

It should be understood that the first terminal determining a set formed by the carriers whose CBR is smaller than the second threshold among the multiple carriers as the third carrier set, and selecting at least one carrier used to transmit the PSFCH in the third carrier set, can also described as: the first terminal selects a carrier whose CBR is smaller than the second threshold among the multiple carriers as a candidate carrier, and the first terminal selects at least one carrier for transmitting PSFCH from the candidate carrier.

It should be understood that the third carrier set mentioned hereinafter is equivalent to the candidate carrier, that is, the two concepts can be replaced with each other, which will not be repeated in this application.

Optionally, the first terminal may select at least one carrier used to transmit the PSFCH in the third carrier set in the following several optional ways, but is not limited thereto.

Optional way 1: The first terminal selects at least one carrier for transmitting the PSFCH from the third carrier set in the order of CBR from low to high. For example: the first terminal selects the carrier with the smallest CBR in the third carrier set to transmit the PSFCH. Or, the first terminal selects the carrier with the smallest and second smallest CBR in the third carrier set to transmit the PSFCH.

Optional way 2, the first terminal determines a first intersection set of the third carrier set and a fourth carrier set formed by the above multiple carriers. The first terminal selects at least one carrier for transmitting the PSFCH in the first intersection set.

It should be understood that, the first terminal determining the first intersection set of the third carrier set and the fourth carrier set formed by the plurality of carriers, and selecting at least one carrier used to transmit the PSFCH in the first intersection set, can also be described as: if the first terminal receives sidelink data on a certain carrier in the third carrier set, the first terminal determines that the carrier is a carrier used to transmit the PSFCH.

Optional way 3, the first terminal determines the second intersection set of the third carrier set and a fifth carrier set, where the fifth carrier set is a carrier set formed by at least one carrier indicated by the first indication information. The first terminal selects at least one carrier for transmitting the PSFCH in the second intersection set.

It should be understood that the first terminal determining the second intersection set of the third carrier set and the fifth carrier set, and selecting at least one carrier for transmitting the PSFCH in the second intersection, can also be described as: if a certain carrier is both a candidate carrier and is also a carrier indicated by the first indication information, then the first terminal determines that the carrier is a carrier used to transmit the PSFCH.

Optional way 4, the first terminal determines a third intersection set between the third carrier set and a first carrier set, wherein the first carrier set is the carrier set configured by the carrier configuration information of the PSFCH. The first terminal selects at least one carrier for transmitting the PSFCH in the third intersection set.

It should be understood that the first terminal determining the third intersection of the third carrier set and the first carrier set, and selecting at least one carrier for transmitting the PSFCH in the third intersection, can also be described as: if a certain carrier it is both a candidate carrier and also a carrier configured in the carrier configuration information of the PSFCH, then the first terminal determines that the carrier is a carrier for transmitting the PSFCH.

It should be noted that the above four examples respectively describe how the first terminal selects at least one carrier for transmitting the PSFCH according to multiple carriers, first indication information, carrier configuration information of the PSFCH, and CBR. In fact, the first terminal can select at least one carrier for transmitting the PSFCH according to any combination of these four types of information. For example: assume that the first terminal needs to select at least one carrier for transmitting the PSFCH according to at least two types of information among the four types of information. Then the first terminal can determine at least one carrier used to transmit the PSFCH according to each type of information in at least two types of information, that is, at least two carrier sets are determined, and secondly, the first terminal takes the intersection set of the at least two carrier sets as the least one carrier finally used to transmit the PSFCH. Alternatively, the first terminal selects a carrier set from at least two carrier sets according to a certain preset rule as at least one carrier finally used to transmit the PSFCH. For example: the preset rule is to preferentially select the carrier set indicated by the first indication information. This application does not limit the preset rules.

It should be understood that the first terminal may select at least one carrier for transmitting the PSFCH according to any combination of these four types of information, and there are other implementable ways, which are not limited in this application.

For example: the first terminal determines the first carrier set according to the carrier configuration information of PSFCH, further, the above-mentioned multiple carriers form the fourth carrier set, and the carrier for transmitting the PSFCH is determined according to the first carrier set and the fourth carrier set, for example, select the intersection set of the first carrier set and the fourth carrier set as a carrier for transmitting the PSFCH.

For another example: the above-mentioned multiple carriers form a fourth carrier set, and further, the CBR of the resource pool on each carrier in the fourth carrier set is measured, and the carrier with the lowest CBR is selected as the carrier for transmitting the PSFCH.

For yet another example: the above-mentioned multiple carriers form a fourth carrier set, further, in the fourth carrier set, the CBR of the resource pool on each carrier is measured, the carrier whose measured CBR is lower than the second threshold is taken as a candidate carrier, and the carrier for transmitting the PSFCH is selected from the candidate carrier in the order of CBR from low to high.

It should be understood that, in an implementation manner, if the first terminal receives the sidelink data sent by the second terminal on any carrier, the first terminal sends the PSFCH for the sidelink data on the carrier. For example, for any sidelink data on multiple carriers, the first terminal transmits the PSFCH corresponding to the sidelink data by using the carrier that sends the sidelink data.

The method embodiment of the present application is described in detail above with reference to FIG. 13 to FIG. 17, and the device embodiment of the present application is described in detail below in conjunction with FIG. 18 to FIG. 22. It should be understood that the device embodiment and the method embodiment correspond to each other. Similar descriptions can refer to the method embodiments.

Figure 18:
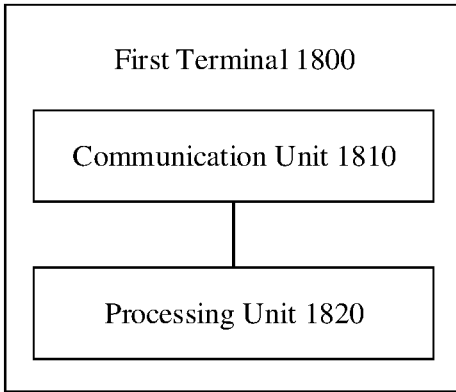
FIG. 18 illustrates a schematic block diagram of a first terminal 1800 according to an embodiment of the present application.

FIG. 18 shows a schematic block diagram of a first terminal 1800 according to an embodiment of the present application. As shown in FIG. 18, the first terminal 1800 includes: a communication unit 1810 and a processing unit 1820, the communication unit 1810 is configured to receive sidelink data sent by a second terminal on multiple carriers. The processing unit 1820 is configured to select at least one carrier for transmission a PSFCH according to at least one of first indication information, carrier configuration information of the PSFCH, CBR, and the multiple carriers. Wherein, the PSFCH is configured to carry sidelink feedback information of the sidelink data, and the first indication information is configured to indicate at least one carrier for transmitting the PSFCH.

Optionally, the processing unit 1820 is further configured to: select at least one carrier for transmitting the PSFCH among the multiple carriers.

Optionally, the processing unit 1820 is further configured to: select at least one carrier for transmitting the PSFCH according to the index information.

Optionally, the processing unit 1820 is further configured to: select a carrier corresponding to the carrier index information as the carrier for transmitting the PSFCH.

Optionally, the first indication information is carried in any one of: SCI, PC5-RRC signaling, or MAC CE.

Optionally, if the first indication information is carried in the PC5-RRC signaling, the first indication information is generated by the first terminal or is obtained from the second terminal.

Optionally, the carrier configuration information of the PSFCH is used to configure a first carrier set for transmitting the PSFCH.

Optionally, the processing unit 1820 is further configured to: select at least one carrier for transmission the PSFCH from the first carrier set.

Optionally, the carrier configuration information of the PSFCH is pre-configuration information or network configuration information.

Optionally, the processing unit 1820 is further configured to: select at least one carrier for transmission the PSFCH from a second carrier set in an order of CBR from low to high. wherein, the second carrier set comprises all carriers supported by sidelink transmission between the first terminal and the second terminal.

Optionally, the processing unit 1820 is further configured to select at least one carrier for transmission the PSFCH from the multiple carriers in an order of CBR from low to high.

Optionally, the processing unit 1820 is further configured to: determine a set formed by carriers whose CBR is smaller than a first threshold among the multiple carriers as a third carrier set. Select at least one carrier for transmission the PSFCH from the third carrier set.

Optionally, the processing unit 1820 is further configured to: select at least one carrier for transmission the PSFCH from the third carrier set in an order of CBR from low to high.

Optionally, the processing unit 1820 is further configured to: determine a first intersection set of the third carrier set and a fourth set of carriers formed by the multiple carriers. Select at least one carrier for transmission the PSFCH from the first intersection set.

Optionally, the processing unit 1820 is further configured to: determine a second intersection set of the third carrier set and a fifth carrier set, wherein the fifth carrier set is a carrier set formed by at least one carrier indicated by the first indication information. Select at least one carrier for transmission the PSFCH from the second intersection set.

Optionally, the processing unit 1820 is further configured to: determine a third intersection set of the third carrier set and a first carrier set, wherein the first carrier set is a carrier set configured by the carrier configuration information of the PSFCH. Select at least one carrier for transmission the PSFCH from the third intersection set.

Optionally, the sidelink data sent on the multiple carriers comprises: sidelink data sent simultaneously, and/or sidelink data not sent simultaneously.

Optionally, the sidelink data sent on the multiple carriers belong to a same data block or different data blocks.

Optionally, the sidelink feedback information corresponding to the sidelink data sent on the multiple carriers is carried on one PSFCH, or carried on different PSFCHs.

Optionally, the carrier for transmitting the first sidelink data is different from the carrier for transmitting the PSFCH corresponding to the first sidelink data. Wherein, the first sidelink data is one piece of sidelink data among the sidelink data sent on the plurality of carriers.

Optionally, in some embodiments, the above-mentioned communication unit may be a communication interface or a transceiver, or an input-output interface of a communication chip or a system-on-chip. The aforementioned processing unit may be one or more processors.

It should be understood that the first terminal 1800 according to the embodiment of the present application may correspond to the first terminal in the method embodiment, and the above-mentioned and other operations and/or functions of each unit in the first terminal 1800 are respectively the corresponding process in order to realize the first terminal in the method embodiment, which will not be repeated here for brevity.

FIG. 19 shows a schematic block diagram of a second terminal 1900 according to an embodiment of the present application. As shown in FIG. 19, the second terminal 1900 includes: a communication unit 1910, configured to: send sidelink data to a first terminal on multiple carriers. Send first indication information to the first terminal, or the sidelink data comprises the first indication information. Wherein, the first indication information is configured to indicate at least one carrier for transmitting a PSFCH, and the PSFCH is configured to carry sidelink feedback information of the sidelink data.

Optionally, the first indication information comprises index information, and the index information is used to determine at least one carrier for transmitting the PSFCH.

Optionally, the index information is carrier index information, and a carrier corresponding to the carrier index information is the carrier for transmitting the PSFCH.

Optionally, the first indication information is carried in any of: SCI, PC5-RRC signaling, or MAC CE.

Optionally, the sidelink data sent on the multiple carriers comprises: sidelink data sent simultaneously, and/or sidelink data not sent simultaneously.

Optionally, the sidelink data sent on the multiple carriers belong to a same data block or different data blocks.

Optionally, the sidelink feedback information corresponding to the sidelink data sent on the multiple carriers is carried on one PSFCH, or carried on different on the PSFCHs.

Optionally, the carrier for transmitting the first sidelink data is different from the carrier for transmitting the PSFCH corresponding to the first sidelink data. Wherein, the first sidelink data is one piece of sidelink data among the sidelink data sent on the plurality of carriers.

Optionally, in some embodiments, the above-mentioned communication unit may be a communication interface or a transceiver, or an input-output interface of a communication chip or a system-on-chip. The aforementioned processing unit may be one or more processors.

It should be understood that the second terminal 1900 according to the embodiment of the present application may correspond to the second terminal in the method embodiment, and the above-mentioned and other operations and/or functions of each unit in the second terminal 1900 are respectively the corresponding process in order to realize the second terminal in the method embodiment, which will not be repeated here for brevity.

Figure 20:
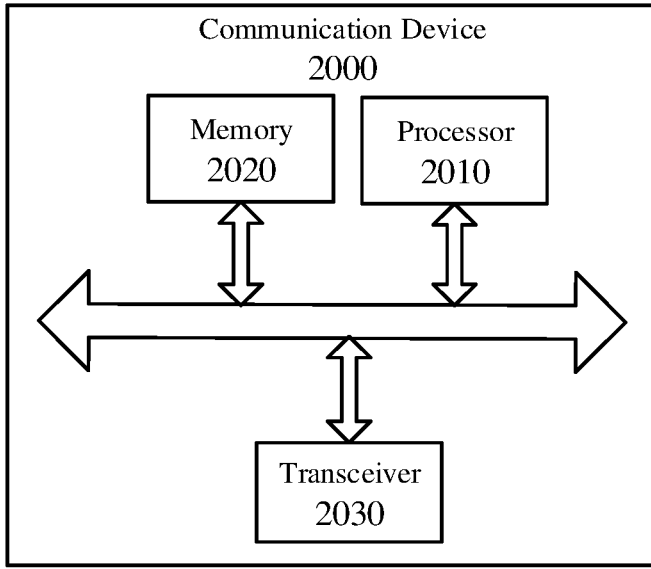
FIG. 20 is a schematic structural diagram of a communication device 2000 provided in an embodiment of the present application.

FIG. 20 is a schematic structural diagram of a communication device 2000 provided by an embodiment of the present application. The communication device 2000 shown in FIG. 20 includes a processor 2010, and the processor 2010 can invoke and run a computer program from a memory, so as to implement the method in the embodiment of the present application.

Optionally, as shown in FIG. 20, the communication device 2000 may further include a memory 2020. Wherein, the processor 2010 can invoke and run a computer program from the memory 2020, so as to implement the method in the embodiment of the present application.

The memory 2020 may be an independent device independent of the processor 2010, or may be integrated in the processor 2010.

Optionally, as shown in FIG. 20, the communication device 2000 may further include a transceiver 2030, and the processor 2010 may control the transceiver 2030 to communicate with other devices, specifically, to send information or data to other devices, or receive information or data sent by other devices.

The transceiver 2030 may include a transmitter and a receiver. The transceiver 2030 may further include an antenna(s), and the number of the antenna may be one or more.

Optionally, the communication device 2000 may be the first terminal of the embodiment of the present application, and the communication device 2000 may implement the corresponding processes implemented by the first terminal in the methods of the embodiment of the present application. For the sake of brevity, it will not be repeated herein.

Optionally, the communication device 2000 may be the second terminal, and the communication device 2000 may implement the corresponding processes implemented by the method provided by second terminal in the embodiments of the present application. For the sake of brevity, it will not be repeated herein.

Figure 21:
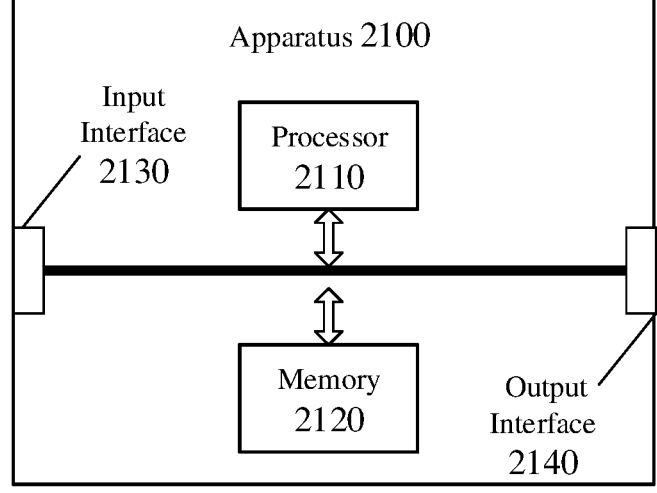
FIG. 21 is a schematic structural diagram of an apparatus according to an embodiment of the present application.

FIG. 21 is a schematic structural diagram of an apparatus according to an embodiment of the present application. The apparatus 2100 shown in FIG. 21 includes a processor 2110, and the processor 2110 can invoke and run a computer program from a memory, so as to implement the method in the embodiment of the present application.

Optionally, as shown in FIG. 21, the apparatus 2100 may further include a memory 2120. The processor 2110 may invoke and run a computer program from the memory 2120, so as to implement the method in the embodiment of the present application.

The memory 2120 may be an independent device independent of the processor 2110, or may be integrated in the processor 2110.

Optionally, the apparatus 2100 may also include an input interface 2130. The processor 2110 can control the input interface 2130 to communicate with other devices or chips, specifically, can obtain information or data sent by other devices or chips.

Optionally, the apparatus 2100 may also include an output interface 2140. The processor 2110 can control the output interface 2140 to communicate with other devices or chips, specifically, can output information or data to other devices or chips.

Optionally, the apparatus can be applied to the first terminal in the embodiments of the present application, and the apparatus can implement the corresponding processes implemented by the first terminal in the methods of the embodiments of the present application. For the sake of brevity, it will not be repeated herein.

Optionally, the apparatus can be applied to the second terminal, and the apparatus can implement the corresponding processes implemented by the second terminal in the methods of the embodiments of the present application. For the sake of brevity, it will not be repeated herein.

It should be understood that the apparatus mentioned in the embodiment of the present application may also be a chip. For example, it may be a system level chip, a system chip, a chip system or a system-on-chip.

Figure 22:
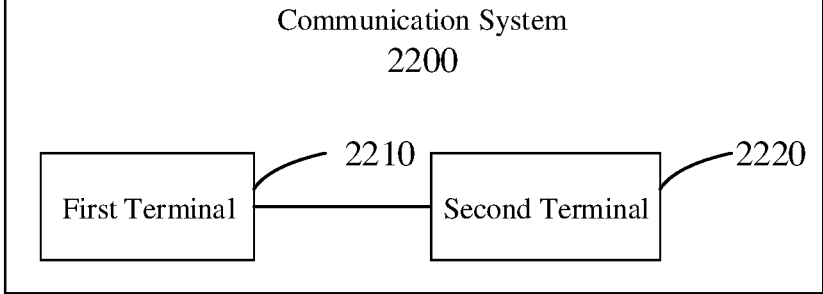
FIG. 22 is a schematic block diagram of a communication system 2200 provided by an embodiment of the present application.

FIG. 22 is a schematic block diagram of a communication system 2200 provided by an embodiment of the present application. As shown in FIG. 15, the communication system 2200 includes a first terminal 2210 and a second terminal 2220.

The first terminal 2210 can be used to realize the corresponding functions realized by the first terminal in the above method, and the second terminal 2220 can be used to realize the corresponding functions realized by the second terminal in the above method. For the sake of brevity, it will not be repeated herein.

It should be understood that the processor in the embodiment of the present application may be an integrated circuit chip, which has a signal processing capability. In the implementation process, each step of the above-mentioned method embodiments may be completed by an integrated logic circuit of hardware in a processor or instructions in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, discrete hardware components. Various methods, steps, and logic block diagrams disclosed in the embodiments of the present application may be implemented or executed. The general-purpose processor may be a microprocessor, or the processor may be any conventional processor, or the like. The steps of the method disclosed in connection with the embodiments of the present application may be directly implemented by a hardware decoding processor, or implemented by a combination of hardware and software modules in the decoding processor. The software module can be located in a mature storage medium in the field such as random access memory, flash memory, read-only memory, programmable read-only memory or electrically erasable programmable memory, or register. The storage medium is located in the memory, and the processor reads the information in the memory, and completes the steps of the above method in combination with its hardware.

It can be understood that the memory in the embodiments of the present application may be a volatile memory or a nonvolatile memory, or may include both volatile and nonvolatile memories. Among them, the non-volatile memory can be read-only memory (ROM), programmable read-only memory (PROM), erasable programmable read-only memory (Erasable PROM, EPROM), electrically program-mable Erase Programmable Read-Only Memory (Electrically EPROM, EEPROM) or Flash. The volatile memory may be Random Access Memory (RAM), which acts as an external cache. By way of illustration and not limitation, many forms of RAM are available such as Static RAM (SRAM), Dynamic RAM (DRAM), Synchronous DRAM (SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (Synchlink DRAM, SLDRAM) and Direct Memory Bus Random Access Memory (Direct Rambus RAM, DR RAM). It should be noted that the memory of the systems and methods described herein is intended to include, but not be limited to, these and any other suitable types of memory.

It should be understood that the above-mentioned memory is illustrative but not restrictive. For example, the memory in the embodiment of the present application may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memory in the embodiments of the present application is intended to include, but not be limited to, these and any other suitable types of memory.

The embodiment of the present application also provides a computer-readable storage medium for storing computer programs.

Optionally, the computer-readable storage medium can be applied to the network device or the base station in the embodiments of the present application, and the computer program enables the computer to execute the corresponding processes implemented by the network device or the base station in the methods of the embodiments of the present application. For brevity, it will not be repeated herein.

Optionally, the computer-readable storage medium can be applied to the mobile terminal/terminal device in the embodiments of the present application, and the computer program enables the computer to execute the corresponding processes implemented by the mobile terminal/terminal device in the various methods of the embodiments of the present application, for the sake of brevity, it is not repeated here.

The embodiment of the present application also provides a computer program product, including computer program instructions.

Optionally, the computer program product may be applied to the network device in the embodiment of the present application, and the computer program instructions cause the computer to execute the corresponding process implemented by the network device in each method of the embodiment of the present application. For the sake of brevity, the details are not repeated here.

Optionally, the computer program product can be applied to the mobile terminal/terminal device in the embodiments of the present application, and the computer program instructions cause the computer to execute the corresponding processes implemented by the mobile terminal/terminal device in the methods of the embodiments of the present application, For the sake of brevity, details are not repeated here.

The embodiment of the present application also provides a computer program.

Optionally, the computer program can be applied to the network device in the embodiment of the present application. When the computer program is run on the computer, the computer executes the corresponding process implemented by the network device in each method of the embodiment of the present application. For the sake of brevity, it will not be repeated here.

Optionally, the computer program can be applied to the mobile terminal/terminal device in the embodiment of the present application. When the computer program is run on the computer, the computer executes each method in the embodiment of the present application to be implemented by the mobile terminal/terminal device. For the sake of brevity, the corresponding process will not be repeated here.

Those skilled in the art can appreciate that the units and algorithm steps of the examples described in conjunction with the embodiments disclosed herein can be implemented by electronic hardware, or a combination of computer soft-ware and electronic hardware. Whether these functions are executed by hardware or software depends on the specific application and design constraints of the technical solution. Those skilled in the art may use different methods to implement the described functions for each specific appli-cation, but such implementation should not be regarded as exceeding the scope of the present application.

Those skilled in the art can clearly understand that for the convenience and brevity of the description, the specific operating process of the above-described system, device and unit can refer to the corresponding process in the foregoing method embodiment, which will not be repeated here.

In the several embodiments provided in this application, it should be understood that the disclosed systems, devices and methods may be implemented in other ways. For example, the device embodiments described above are only illustrative. For example, the division of the units is only a logical function division. In actual implementation, there may be other division methods. For example, multiple units or components can be combined or may be integrated into another system, or some features may be ignored, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, each functional unit in each embodiment of the present application may be integrated into one process-ing unit, each unit may exist separately physically, or two or more units may be integrated into one unit.

If the functions described above are realized in the form of software function units and sold or used as independent products, they can be stored in a computer-readable storage medium. Based on this understanding, the technical solution of the present application is essentially or the part that contributes to the prior art or the part of the technical solution can be embodied in the form of a software product, and the computer software product is stored in a storage medium, including several instructions that are used to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disk or optical disk and other media that can store program codes.

The above is only a specific implementation of the application, but the scope of protection of the application is not limited thereto. Anyone familiar with the technical field can easily think of changes or substitutions within the technical scope disclosed in the application. Should be covered within the protection scope of this application. Therefore, the protection scope of the present application should be based on the protection scope of the claims.

What is claimed is:

1. A wireless communication method, comprising:
   receiving, by a first terminal, sidelink data sent by a second terminal on multiple carriers; and
   selecting, by the first terminal, at least one carrier for transmission a physical sidelink feedback channel (PSFCH) according to a channel busy ratio (CBR), wherein, the PSFCH is configured to carry sidelink feedback information of the sidelink data on the multiple carriers,
   wherein the method further comprises:
   determining, by the first terminal, a set formed by carriers whose CBR is smaller than a first threshold among the multiple carriers as a third carrier set; and
   selecting, by the first terminal, at least one carrier for transmission the PSFCH from the third carrier set.

2. The method according to claim 1, wherein the at least one carrier for transmission the PSFCH is further selected according to multiple carriers, and the method comprises:
   selecting, by the first terminal, at least one carrier for transmitting the PSFCH among the multiple carriers.

3. The method according to claim 1, wherein the at least one carrier for transmission the PSFCH is further selected according to first indication information, and the first indication information is configured to indicate at least one carrier for transmitting the PSFCH, and the method further comprises:
   selecting, by the first terminal, at least one carrier for transmitting the PSFCH according to the index information.

4. The method according to claim 3, wherein the index information is carrier index information, and the selecting, by the first terminal, at least one carrier for transmitting the PSFCH according to the index information, comprises:
   selecting, by the first terminal, a carrier corresponding to the carrier index information as the carrier for transmitting the PSFCH.

5. The method according to claim 1, wherein the at least one carrier for transmission the PSFCH is further selected according to carrier configuration information of the PSFCH, and wherein the carrier configuration information of the PSFCH is used to configure a first carrier set for transmitting the PSFCH.

6. The method according to claim 1, wherein the selecting, by the first terminal, at least one carrier for transmission the PSFCH from the third carrier set, comprises:
   selecting, by the first terminal, at least one carrier for transmission the PSFCH from the third carrier set in an order of CBR from low to high.

7. The method according to claim 1, wherein the selecting, by the first terminal, at least one carrier for transmission the PSFCH from the third carrier set, comprises:
   determining, by the first terminal, a first intersection set of the third carrier set and a fourth set of carriers formed by the multiple carriers; and
   selecting, by the first terminal, at least one carrier for transmission the PSFCH from the first intersection set.

8. The method according to claim 1, wherein the selecting, by the first terminal, at least one carrier for transmission the PSFCH from the third carrier set, comprises:
   determining, by the first terminal, a second intersection set of the third carrier set and a fifth carrier set, wherein the fifth carrier set is a carrier set formed by at least one carrier indicated by the first indication information; and
   selecting, by the first terminal, at least one carrier for transmission the PSFCH from the second intersection set.

9. The method according to claim 1, wherein the selecting, by the first terminal, at least one carrier for transmission the PSFCH from the third carrier set, comprises:
   determining, by the first terminal, a third intersection set of the third carrier set and a first carrier set, wherein the first carrier set is a carrier set configured by the carrier configuration information of the PSFCH; and
   selecting, by the first terminal, at least one carrier for transmission the PSFCH from the third intersection set.

10. The method according to claim 1, wherein the sidelink data sent on the multiple carriers comprises: sidelink data sent simultaneously, and/or sidelink data not sent simultaneously.

11. The method according to claim 1, wherein the sidelink data sent on the multiple carriers belong to a same data block or different data blocks.

12. The method according to claim 1, wherein the sidelink feedback information corresponding to the sidelink data sent on the multiple carriers is carried on one PSFCH, or carried on different PSFCHs.

13. The method according to claim 1, wherein the carrier for transmitting the first sidelink data is different from the carrier for transmitting the PSFCH corresponding to the first sidelink data; and
   wherein, the first sidelink data is one piece of sidelink data among the sidelink data sent on the plurality of carriers.

14. A terminal device, comprising: a processor and a memory, the memory is configured to store a computer program, and the processor is configured to call and run the computer program stored in the memory, to execute a wireless communication method, comprising:
   receiving, by the terminal device, sidelink data sent by a second terminal on multiple carriers; and
   selecting, by the terminal device, at least one carrier for transmission a physical sidelink feedback channel (PSFCH) according to a channel busy ratio (CBR), wherein, the PSFCH is configured to carry sidelink feedback information of the sidelink data on the multiple carriers
   wherein the processor is further configured to:
   determine a set formed by carriers whose CBR is smaller than a first threshold among the multiple carriers as a third carrier set; and
   select at least one carrier for transmission the PSFCH from the third carrier set.

* * * * *